May 24, 1966  R. A. ERREN  3,252,572
ELECTRICAL INSPECTION MACHINE
Filed Jan. 30, 1964  7 Sheets-Sheet 1
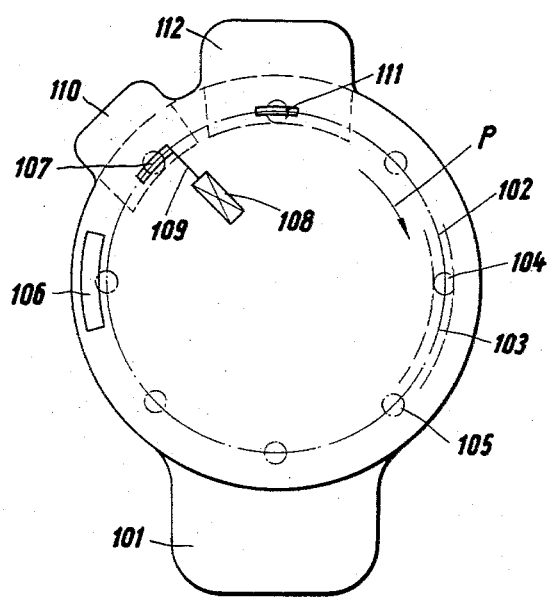
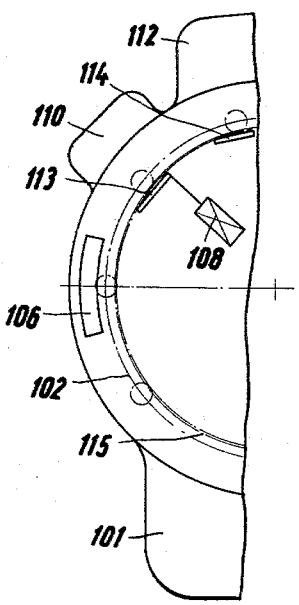
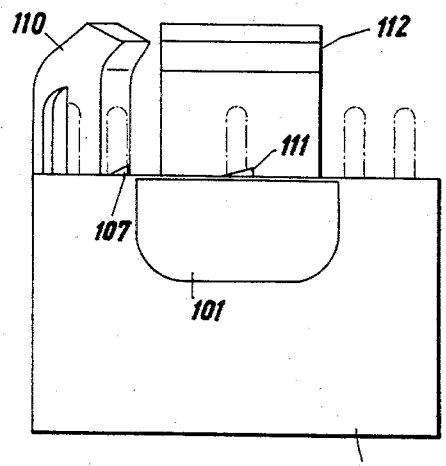

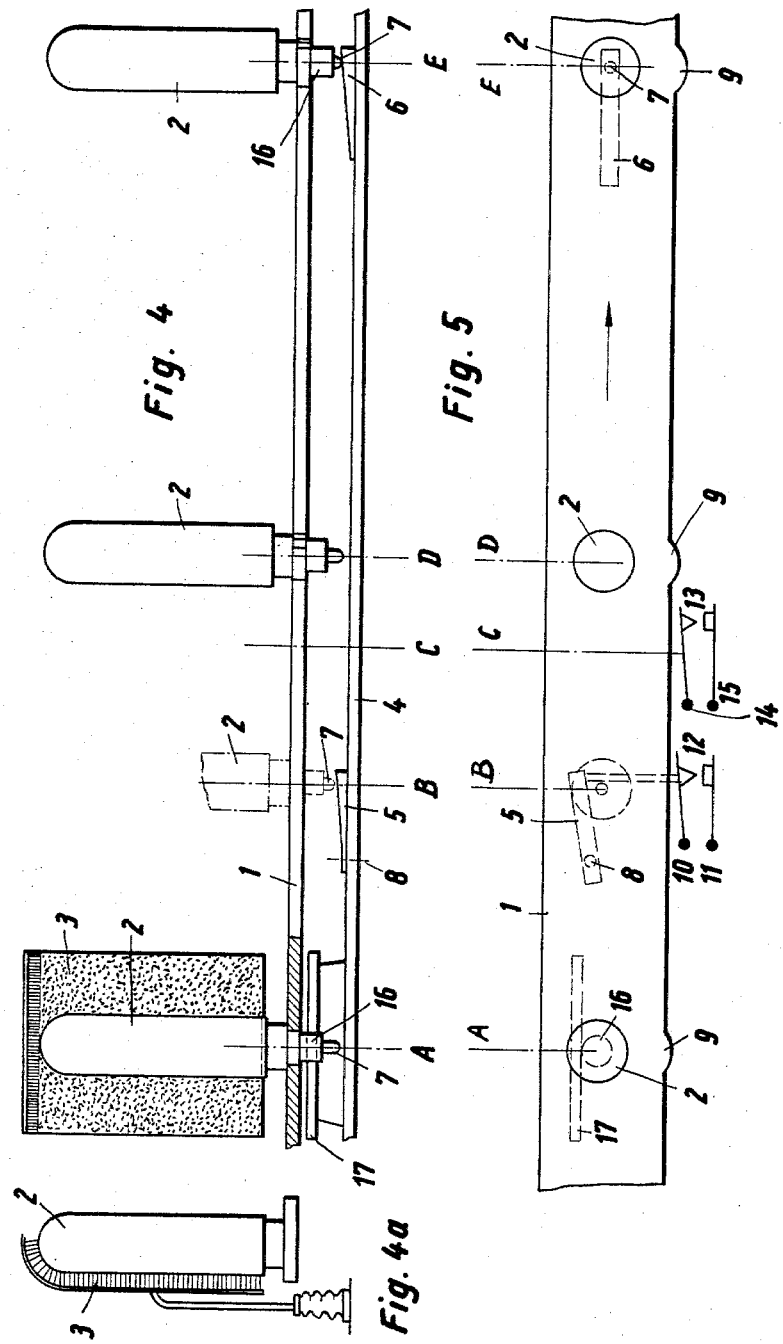

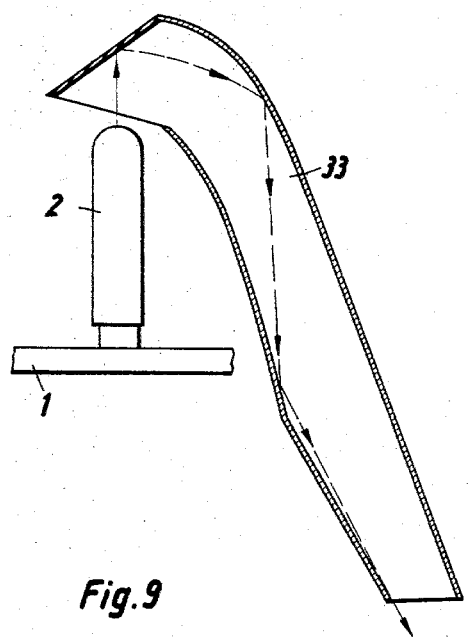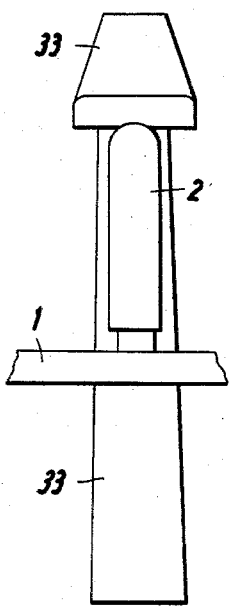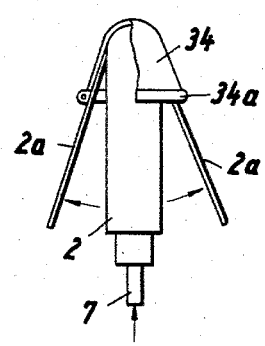

May 24, 1966 R. A. ERREN 3,252,572
ELECTRICAL INSPECTION MACHINE
Filed Jan. 30, 1964 7 Sheets-Sheet 5

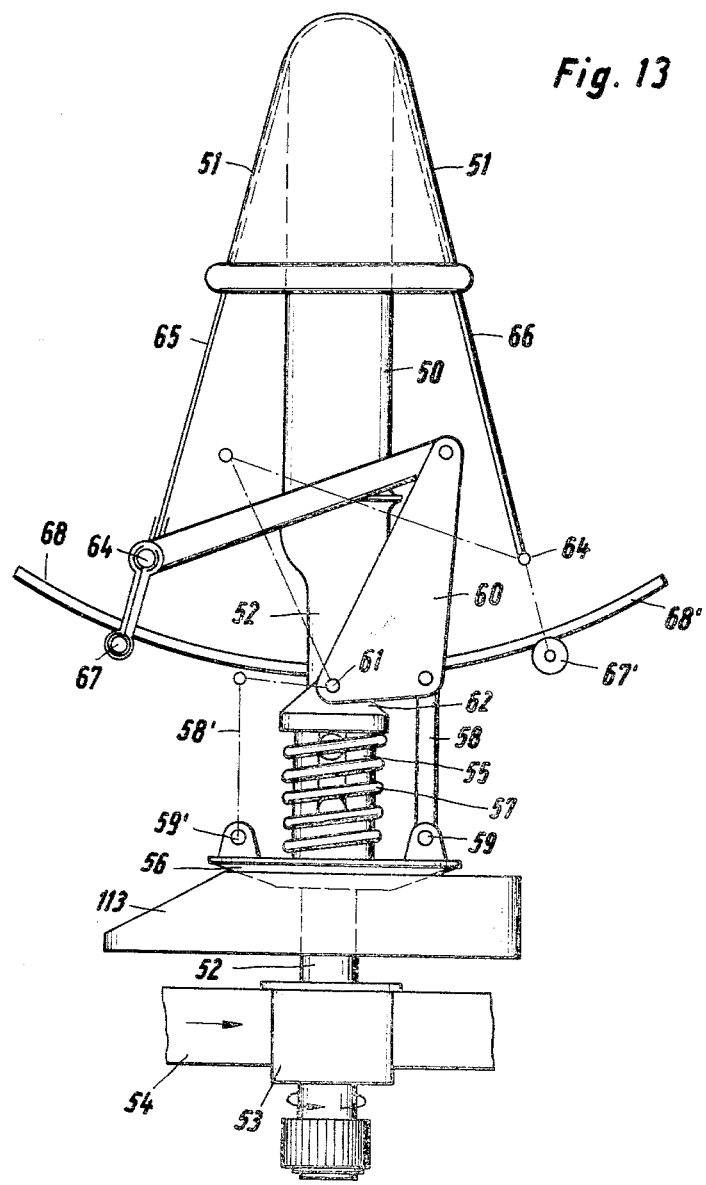

United States Patent Office 3,252,572
Patented May 24, 1966

3,252,572
ELECTRICAL INSPECTION MACHINE
Rudolf Arnold Erren, Hannover-Limmer, Germany, assignor to Bruno Engelhardt, Bremen, Germany, a corporation
Filed Jan. 30, 1964, Ser. No. 341,317
10 Claims. (Cl. 209—81)

The present invention relates to a machine for inspection of thin-walled hollow articles of rubber or rubber-like materials which are drawn free from folds over a cylindrical carrier, which may act as an electrode, with an ejection device which is actuatable in dependence upon the results of the inspection any number of carriers for carrying the hollow articles to be inspected being arranged on a continuously moving track. The present invention relates particularly to the ejection device of such a machine.

As such an ejection device, there is known a compressed air arrangement in which a nozzle is resiliently held by springs on the underside of a transport ring on which cylindrical carriers are mounted so that the nozzle can come into connection with channels and thus the insides of the carriers on which the hollow articles are carried.

It is also known, for ejection of the articles from the cylindrical carriers, to provide a driven band which by rhythmic raising in the axial direction is brought into engagement with the hollow articles. The pressure of the band acting simultaneously in the axial direction of the hollow article can however readily lead to upsetting of the articles. In addition a stripping force applied only along an outer, axial line along the articles leads only to damage to the elastic hollow articles on the cylindrical carriers and adhesion to the carriers, caused by the elasticity of the hollow articles, thus arises.

It is also known for stripping purposes to provide a pair of driven rollers running at an angle to the cylindrical carriers by the engagement of which unrolling from the lower part of the cylindrical carrier takes place. Because of the rigid arrangement of the rollers, however, automatic lockings or pinchings can occur.

It is an object of the present invention to avoid these disadvantages.

A further object of the present invention lies in the provision of new means for ejecting the hollow articles.

Another object of the present invention is to provide a novel machine on which the hollow articles can be placed without damage and removed by simple means according to the results of the inspection.

These objects are achieved in accordance with the invention in that in the periphery of the cylindrical carriers or inner electrodes two or more longitudinally extending, preferably strip-shaped, elements are so spreadably pivoted that the ends of the longitudinally extending, preferably strip-shaped, elements lying in the region of the lower portions of the carriers or inner electrodes are spreadable, actuating members being provided in the path of the carriers or inner electrodes which operate on members movable axially of the carriers or inner electrodes for spreading the longitudinally extending, preferably strip-shaped elements.

According to a particularly preferred embodiment, there are provided two actuating members constructed as camming surfaces, of which one is arranged so that the axially movable member of all the carriers, which in this embodiment are constructed as inner electrodes, slide onto and are actuated by such camming surfaces, whereas the other ramp or camming surface is movably arranged and is movable into the path of the axially movable members under the control of an electric circuit included in the inspection device.

Advantageously, the inner electrodes are arranged spaced apart and rotatable in a known manner, but with fixed axes which are preferably vertical to a continuous path. The rotatable arrangement is a particular help for the carriers when they are constructed as inner electrodes since sensing of the whole circumference of the hollow articles is then possible by means of a flat counter-electrode.

According to a particularly preferred feature, opposite each ramp a lug is arranged which has a projecting roof portion over the path of the carrrier or inner electrode on which the displaced hollow article is drawn and from which it is moved at an incline and is thereby guided into a container or on to a conveyor device. Sorting after ejection from the supports is thus simple.

A further advantageous feature of the invention consists in the arrangement of an attraction or repulsion magnet for actuating the adjustable ramps, which magnet is actuated in dependence upon a control step, initiated by the electrodes of the inspection device by means of a stepping switch which opens the control circuit in known manner as soon as the magnet is energised.

Also, an advantageous feature of the invention consists in the provision in the path of movement at a distance from the carriers or inner electrodes of cams for the actuation of a contact switch, and a further contact switch is in operative connection with the adjustable ramps, both contact switches being arranged in series with a control relay connected in series in the electric circuit so that the contact switches are closed as long as the ramps are in the operative position and the switches are temporarily closed when a cam is moved into the path of movement.

Further objects and advantages of the present invention will be more readily understood by those skilled in the art from the following description thereof, with reference to the accompanying drawings, in which:

FIG. 1 shows a plan view of a machine according to the present invention;

FIG. 2 shows a side view of the machine of FIG. 1;

FIG. 3 shows a partial plan view corresponding to FIG. 1 of a modified but related construction;

FIG. 4 shows a developed view of an operating section of the machine shown in FIG. 2 in elevation;

FIG. 4a shows that part of the path of movement in horizontal projection at right angles to FIG. 1 which relates to the actual inspection position, namely where the electrodes are standing opposite one another;

FIG. 5 shows a plan view of FIG. 4 with diagrammatically indicated switch means;

Figure 10:
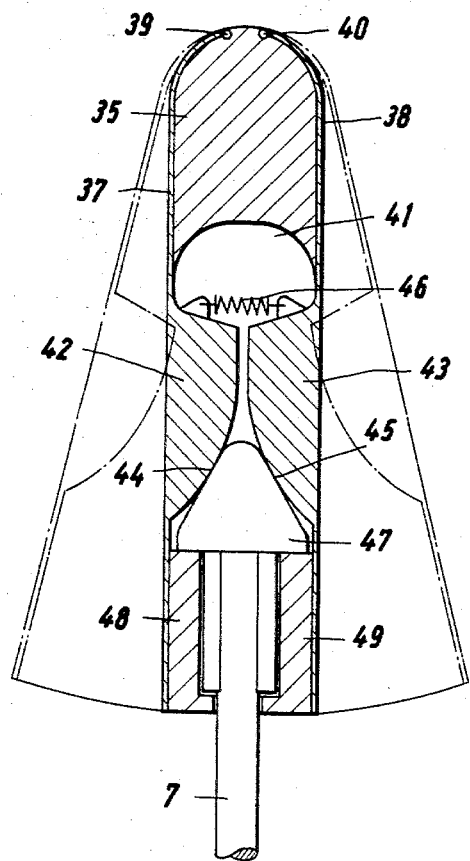
Figure 11:
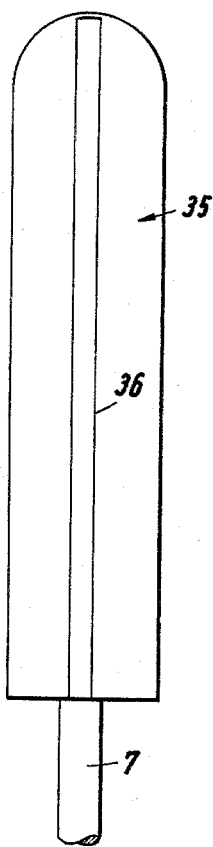
Figure 12:
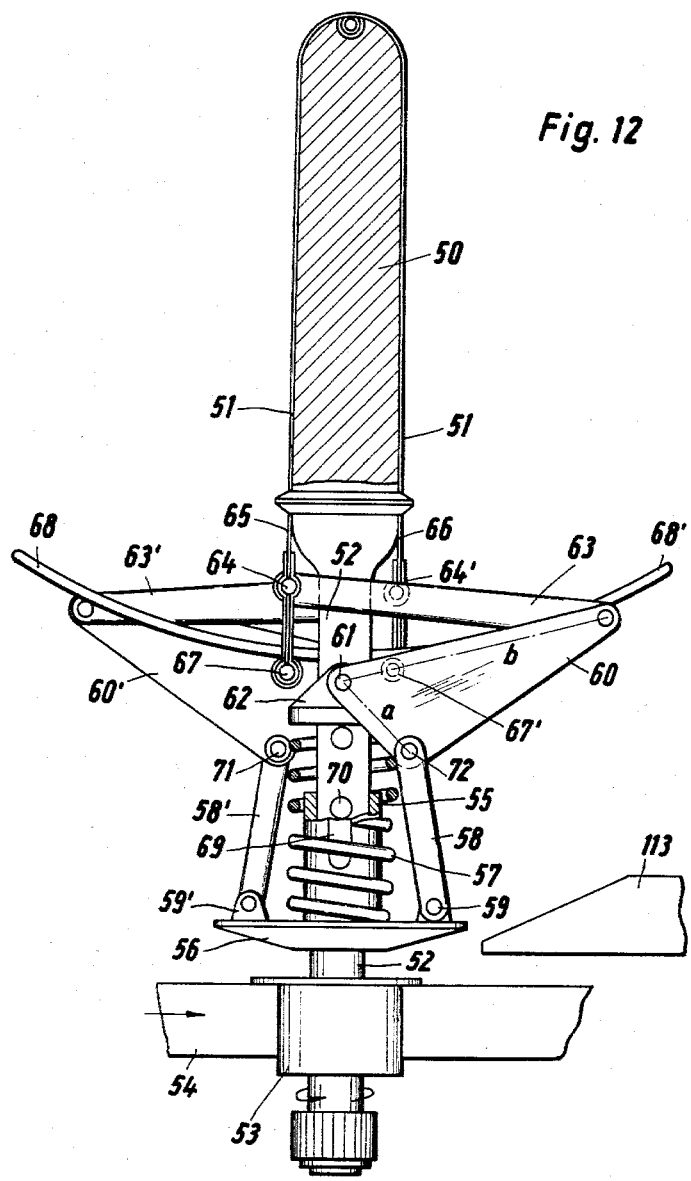

FIGS. 7–9 show by way of example various parts of the machine, FIGS. 7 and 8 showing the arrangement of a discharge chute for the test articles in two mutually perpendicular horizontal projections (FIG. 7 in section and FIG. 8 in elevation), and FIG. 9 showing a diagrammatic illustration of a carrier formed as a testing electrode which also shows how the hollow article is stripped off the electrode and moved to one side at the appropriate position so that it passes into the discharge chute illustrated in FIGS. 7 and 8;

FIG. 10 shows a side view taken in section of a cylindrical carrier;

FIG. 11 shows a side view of the carrier, but displaced by 90° with respect to FIG. 10;

FIG. 12 shows a side view of a carrier for operating in the machine of FIGS. 1 to 3 with a special actuating means;

FIG. 13 is a view corresponding to FIG. 12 but in another operative position.

The drawings of FIGS. 1 and 2 show a machine in plan view and side view. This machine comprises a frame 100 having a trough 101 at one side for the reception of articles to be inspected. Adjacent this trough 101, a guide track or path is provided, indicated at 102. This guide path 102 is circular, and on it by means of a rail system 103, which is not shown in detail, a series of carriers or inner electrodes 104, 105 etc. are movable. This rail system is associated with at least one inspection electrode arrangement 106 to which the articles to be tested are advanced in rotation.

In the direction of rotation indicated by P, i.e. in the clockwise direction, beyond the inspection electrode arrangement 106 a ramp 107 is arranged in the guide path which, by means of an electromagnet 108 and a rod 109 connecting this electromagnet with the ramp, is movable into the guide path at 103 or is retractable from this path. The kind of movement depends upon whether the inspection electrode arrangement 106 finds a fault or not. The guide path is provided in the region of the movable ramp 107 with a receiving funnel 110 into which if necessary, i.e. on drawing of the ramp into the guide path, rubber articles to be tested are removed. Beyond the location of the ramp 107 in the direction of the rotary movement, a stationary ramp 111 is provided which is associated with a collecting channel 112 in order in the region of the ramp 111 to collect automatically removed rubber articles which have not previously been collected in the funnel 110. The frame 100 contains driving arrangements, gears and frame portions for the carriers. These means are not shown in detail as they do not form any essential part of the invention. The channels 110 and 112 are illustrated partially in broken lines in order to make the underlying portions of the guide path and ramp more visible. The parts necessary for the important operations according to the invention are described below.

The ramps illustrated at 5 and 6 in FIGS. 4 and 5 correspond to those shown at 107 and 111 in FIGS. 1 and 2. The inspection electrode arrangement illustrated at 3 in FIG. 4 is illustrated at 106 in FIG. 1. The chute illustrated at 33 in FIG. 7 corresponds to one of the channels 110 or 112 shown in FIG. 2, depending upon which ramp it is associated with.

According to FIGS. 4, 4a and 5 a track 1, which is shown as an extended band or plate and corresponds to the track 102 in FIG. 1, is provided at equally spaced intervals with smooth, electrically conductive carriers 2 serving as inner electrodes, whose shape is determined in accordance with the shape of the hollow articles to be inspected and which are therefore preferably replaceable. These electrodes are rotatably mounted in the track 1 and include friction wheels 16 on their spindles or other suitable points. These friction wheels co-operate with a friction rail 17 arranged parallel to the track 1.

The friction wheels are penetrated axially by a rod 7 and have embedded in their walls longitudinally-extending elements two strips 2a connected at the dome or upper part of the electrode as shown diagrammatically in FIG. 9. These strips 2a are operatively connected by suitable members, for example levers, with the axial rods 7 so that axial movement of the shaft 7 effects spreading apart of the strips 2a as shown in FIG. 9. Spreading of the strips 2a by axial movement of the rods 7 is effected by any suitable means known in the art.

At one position in the track 1 it extends past a counter-electrode, which is preferably in the form of a soft elastic brush 3 of conductive bristles or thin wires, which is shaped so that the whole surface of hollow article 34 mounted on the electrode 2 is contacted by the brush when the electrode 2 is rolled along the brush surface.

Beneath the moving track 1 a stationary track 4 is arranged on which at a suitable position the brushes 3 are insulatedly mounted. At this position, there is also provided a friction strip 17.

The instant at which the hollow article 34 to be inspected has been contacted over its whole surface at least once between the brush 3 and the electrode 2 is indicated in FIGS. 4 and 5 at A. The distance between the electrodes 2 on the track 1 is A–D or D–E. Between the points A and D a ramp 5 is arranged at B which can be so moved that either the rod 7 of each electrode 2 passing the station B passes freely by the ramp 5 or so that by a corresponding movement of the ramp 5, for example by pivoting thereof about a fulcrum 8, the rod 7 runs onto the ramp 5 and thus is moved up axially upwardly, whereby the bars 2a illustrated in FIG. 9 are spread apart. This spreading apart causes the hollow body 34 mounted on the electrode 2, as shown in FIG. 9, to be rolled upwardly with the roll portion 34a and finally to be ejected upwardly under its own tension.

At the station C an electric contact switch member 13 is rigidly or adjustably mounted on the track 1 and the track 1 also includes cams 9 spaced apart by the spacing of the electrodes, which cams actuate the switch 13 so that on passage of a cam 9 past the switch 13 the latter is closed.

The ramp 5 is brought into the ejection position by an electromagnet which is not shown in FIGS. 4 and 5 but is indicated at 108 in FIG. 1 when certain steps now to be described take place. A further switch 12 is so connected with the ramp 5 that its contacts complete a circuit so long as the ramp 5 is in its upper or ejection position.

Beyond the station D in the direction of movement of the track 1 and on the rigid portion 4 of the machine, there is a further ramp 6 which is fixed and axially moves the rods 7 of all the electrodes 2 passing the station E so as to cause ejection movement of the strips 2a. This ramp 6 corresponds to the ramp 111 in FIG. 1.

Operation of the above machine is described below with reference to the circuit diagram of FIG. 6.

Figure 6:
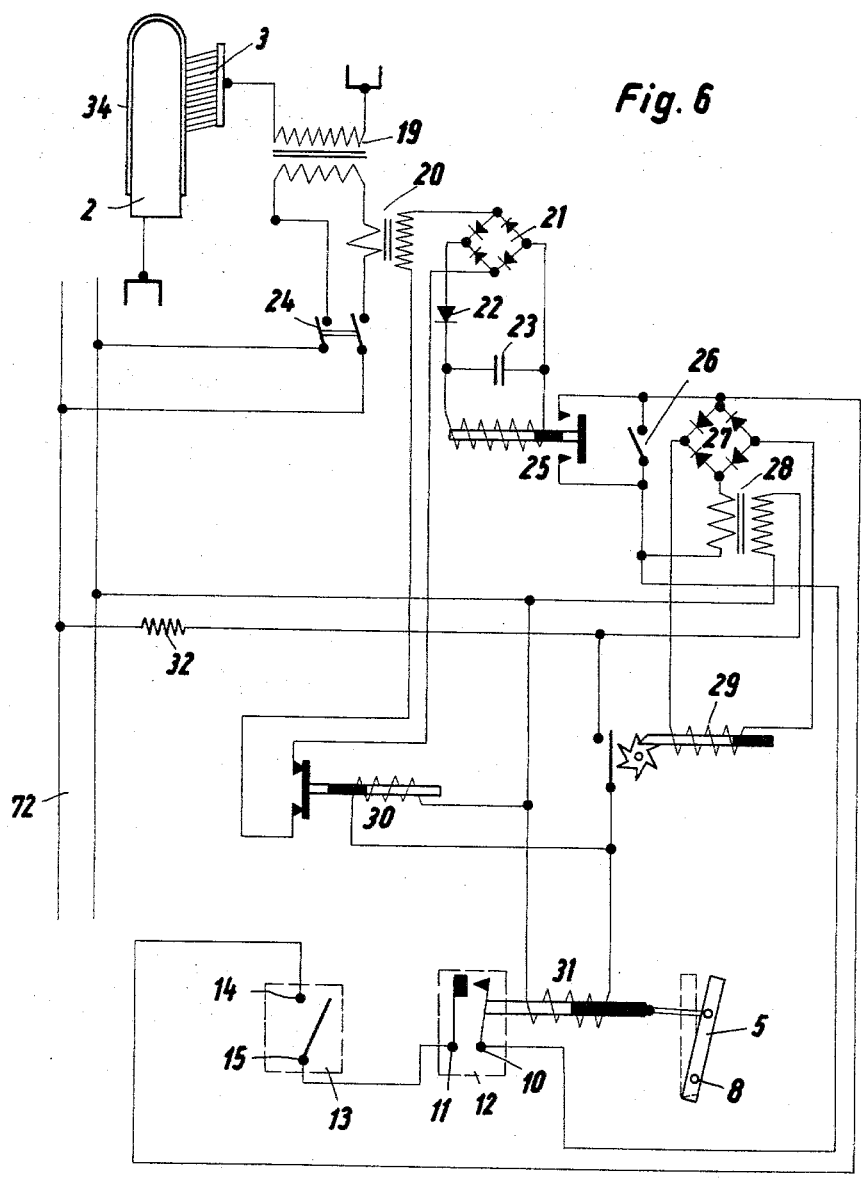
FIG. 6 shows a control circuit for the machine of FIGS. 4 and 5.

In the secondary or, as shown in FIG. 6, the primary winding of the transformer 19, which can be energised by a switch 24, a transformer 20 is disposed whose secondary winding is connected through a rectifier 21, for example a metal rectifier bridge, to the armature winding of a relay 25. In this circuit is included a non-linear resistor 22 which operates so that the relay 25 is first operated after a predetermined threshold voltage is exceeded and a condenser 22 connected in parallel to the armature winding of the relay 25 serves for smoothing the current and also provides a slight and desirable delay in the response.

When the hollow article to be inspected is intact, no current flows between the brush 3 and the electrode 2, the displacement current produced is accordingly so small that no voltage is produced at the secondary winding of the transformer 20 which actuates the relay 25. However, when a pore or thin place exists in a hollow article, and this is located between the brush 3 and the electrode 2, an equalization of potential takes place, between these members which momentarily causes the secondary voltage of the transformer 20 to rise so that the relay 25 responds and closes its contacts.

Any flaw in the hollow article to be inspected is thus reliably indicated by actuation of the relay 25. This actuation of the relay 25 completes through its contacts a circuit through the winding of a stepping switch relay 29 which is operated in known manner so that its contacts complete a circuit in response to the first current pulse, at the second they open and at the third they close and so on. Preferably, this stepping switch relay 29 is energised by a transformer 28 connected to the circuit and a rectifier 27. The manual switch 26 illustrated in FIG. 6 is referred to below.

Parallel to the relay 25 optical or acoustic indicating devices can be connected in known manner, but these are really superfluous since the machine sorts out fully automatically the faulty hollow articles being tested. Under certain circumstances, it can be advantageous to actuate by the relay 25 in known manner a counting device which registers the number of faulty hollow articles.

In the operative position illustrated in FIG. 6, the contacts of the stepping switch relay 29 are open. On the first actuation of the relay 25 in response to the presence of a flaw in the hollow article, they complete a current through an attraction or repulsion magnet 31 and a further circuit through a magnetic switch 30. Both circuits are preferably connected directly to the alternating current and protected by a fuse 32, but they can alternatively be supplied through a rectifier. The supply connection is indicated at 72.

On actuation, the magnet 1 moves the movable ejector ramp 5 into the ejection position. Since, however, the hollow article to be inspected can have more than one flaw, for example two, the same actuation of the relay 25 would occur on the occurrence of the second, fourth, sixth or other flaw and thus the stepping switch would be so actuated that the magnet 31 would be de-energised each time so that the ejector ramp, which is under spring tension, would then be moved out from the ejector position. Ejection would thus not occur in response to two, four, six etc. flaws.

The armature winding of a relay 30 is therefore energised each time the magnet 31 is energised, and on energisation the relay 30 opens its contacts and thus interrupts the circuit through the armature winding of the relay 25 so that the relay 25 is not actuated when the first flaw in a test article is followed by a further one.

Only if ejection of a hollow article having a flaw occurs at station B will the apparatus be returned to the ready condition. This occurs as follows:

On actuation of the magnet 31, i.e. on movement of the ramp 5, a switch 12 coupled with the magnet or the ejector ramp 5 via the contacts 10 and 11 is connected in a circuit which is interrupted by a switch 13 in series with the switch 12, and which allows energisation of the armature winding of the stepping switch relay 29 on closure of the switch 13. If with the ramp 5 in the ejector position, i.e. with the switch 12 closed, the track 1 moves further, the cam 9 associated with the inspected hollow article advances to the switch 13 provided at the station C and thus closes the contacts 14 and 15 and hence completes the circuit through the contacts 10 and 11 and the armature winding of the stepping switch 29.

Meanwhile, if an article containing a flaw has been ejected at station B and the stepping switch 29 has completed a further step by closure of the switch 13, the armature circuit of the magnet 31 is again interrupted and this allows the ejector ramp 5 to return to the rest position. Simultaneously however, the armature winding of the relay 30, which is in parallel with the winding of the magnet 31, is interrupted so that the relay 30 also returns to the rest position in which its contacts complete a circuit through the winding of the starting relay 25, which makes actuation of the relay 25 possible again as soon as the subsequent test article has a flaw. The apparatus is thus returned for ejection of a flaw containing article and is thus ready as soon as the next one contacts the brush 3. The switch 12 is opened by return movement of the ejector ramp and the switch 13 opens as soon as the cam 9 which is associated with the inspected hollow article has passed the switch.

The hand switch 26 only serves to bring the stepping switch 29 correctly into step in a simple manner if this should be delayed for any reason.

However, if the hollow article inspected at station A contains no flaw the relay 25 does not operate and the whole device remains at rest until the switch 13 is actuated by one of the cams. The temporary closure of the switch 13 is ineffective however since the switch 12 connected in series with it remains open if the ejector ramp 5 has not moved.

The flaw-free hollow article thus passes the station B and then passes beyond the station C, for example to station E, to the fixed ramp 6 located there, where it is ejected without the preparation of the machine for inspecting the subsequent hollow article being upset.

Preferably, a chute is arranged at each of the stations B and E on the track 1, as is for example shown in FIGS. 7 and 8 and indicated in FIG. 1 at 110, 112. This chute 33 according to FIGS. 7 and 8 has a roof-shaped projection over the track 1 so that a substantially vertically upwardly ejected hollow article is caught by the projectiton and then removed by bouncing into the chute, which leads downwards into container or conveyor device.

The track 1 can be provided, if it is of suitable length, with more than one inspection station. After the ejection of a flaw-free hollow article, the electrode which then becomes free is provided with a new hollow article and then passes a further inspection position and corresponding ejection devices of a suitable kind.

FIGS. 10 and 11 show a special embodiment of a carrier 35. This has grooves 36 at diametral sections which are disposed axially and in which strips 37, 38 are provided. These strips are connected at their tops to link pins 39 and 40 located in the grooves. The strips have wedge-shaped portions 32, 33 projecting into a slit-shaped opening 41 in the support 45 which form downwardly extending wedge surfaces 44, 45. The wedge members are held elastically together by a spring 46 in order to draw the strips 37, 38 into the grooves. Within the carrier 35 in the lower region within the relatively smooth construction of the groove 41 a wedge member is guided which co-operates with the wedge surfaces 44, 45 and is rigidly connected with the rod 47 (FIG. 9) which co-operates with the ramps 5 and 6. Within the carrier or electrode 35, abutments 48, 49 each support one of the wedge members 47. It can be seen that on raising of the rod 7 in the electrode 35, the strips 37, 38 are pivoted outwardly to the chain-dotted positions in order to cause the article under test to be ejected, whereas on release of the rod 7 the spring 46 not only causes the strips to return to the grooves but also draws down the rod 7 by drawing together the wedge surfaces 44, 45.

A further embodiment is illustrated in FIGS. 3, 12 and 13. In FIG. 3, a section of the circular track of FIG. 1 is shown wherein the same parts are indicated with the same references. The ramps shown in FIG. 1 at 107 and 111 are indicated at 113 and 114. The latter ramps are disposed laterally adjacent the guide track 102 and in fact inwardly of the guide track.

In addition, FIG. 3 shows a gear ring 115 in the guide track and preferably located on the inside of the guide track.

In this embodiment the supports or inner electrodes are provided as shown in FIGS. 12 and 13 with actuating devices, two different positions of operation with reference to the ramp 113 being illustrated.

On a cylindrical carrier 50, which is referred to as such in the following and can be an electrode, the hollow article 51 is smoothly located. The carrier has a narrowed downward projection 52 which serves as a shaft for rotation of the carrier about its central axis and is journalled in a bearing 53 in known manner in the constantly moving track 54, which corresponds to the track 1 in the preceding figures, of the machine. On the reduced portion 52 of the carrier 51 an axially sliding but non-rotatable sleeve 55 is arranged which carries downwardly a slightly conical plate 56 and is held in its lower limiting position by a spring 57. The sleeve 55 is held against rotation, for example by a pin 70 and a slot 69.

On the plate 56 two rods 58, 58' are linked in mutually diametrally opposite positions to pivot pins 59, 59'. At a certain distance from the bearing 53 of the reduced projection 52 of the carrier 50, at both sides of this part, there are pivoted bell-crank levers 60, 60' displaced 90° from the link pins 59, 59', the levers 60, 60' being pivotable in a vertical plane. The fulcrum or pin 61 and that opposite it, not shown in the drawing, are preferably linked to flat inserts or lugs 62 provided for this purpose at the narrowed portion of the carrier 50, of which lugs only one is visible in FIGS. 12 and 13 and has the pivot pin 61. At this point, the apex of the bell-crank lever 60 is located and correspondingly the apex of the other bell-crank lever 60' is pivoted opposite i.e. just behind the narrow part 52 of the carrier 50 in the drawing. At the free ends of the bell-crank levers 60, 60' push rods 58, 58' engage links 71, 72, and on the free ends of the other bell-crank member push rods 63, 63' are pivoted, whose free ends are connected by links 64, 64' with the ends of the strips or bands 65, 66 and which are guided by guide members, for example rollers 67, 67', on the circular tracks 68, 68'. These are guided on the plate 56 or on the lugs or projections 62. The strips or bands 65, 66 pass as smoothly as possible over the surface of the carrier 50 when the device is located in the rest position (FIG. 12). As soon as the carrier 50 is moved on its track to an ejector ramp 113, as shown digrammatically in FIG. 13, this ramp forces the plate 60 upwards against the action of the spring 67 so that the bell-crank levers 60, 60' are pivoted by the push rods 58, 58' so that the push rods 63, 63' connected to them spread open the ends of the ejector strips or bands 65, 66 of the carrier 50.

The hollow article is thus rolled up from its lower end which is preferably provided with an enlarged seam. The hollow article is subjected to such a tension by the spreading open of the strips or bands 65, 66 that it rolls completely off the carrier 50 and is finally ejected from its upper end.

I claim:

1. A machine for the inspection of thin-walled articles of a constructional material selected from the group consisting of rubber and rubber-like materials, which articles are drawn in fold-free condition on to cylindrical supports, which may be constructed as inner electrodes, which machine comprises, in combination, a frame, track means arranged on the frame, a plurality of cylindrical supports mounted in sequential arrangement on the track means and adapted for movement therealong, driving means for moving the supports on the track means, an inspection device located at a first position relative to the track means and adapted for cooperation with the surfaces of the supports for effecting inspection of the hollow articles, a first ejection device located at a second position relative to the track means and behind the first position in the direction of movement of the supports, a second ejection device located at a third position relative to the track means and behind the second position in such direction of movement, connection means operatively associating the inspection device and one ejection device for actuating such ejection device when a first inspection result is given, at least two longitudinally extending elements being provided on each cylindrical support so as to constitute axially part of the surface of such support, link members provided on the free ends of the supports and adapted to spread open the longitudinally-extending elements thereof to cause the ends of such elements in the vicinity of the lower parts of the supports to be spread open outwardly, a member movable relative to the support being mounted thereon associated with spreading means for the elements on the supports, connecting means provided between the movable member and the spreading means, such movable member projecting in the region of the track means, actuating members provided on the track means adapted to cooperate with the movable member of a support moving on the track means, one of said actuating members being operatively associated with the first ejection device and another of said actuating members being operatively associated with the second ejection device, and means for movably supporting at least one of the actuating members for effecting movement thereof relative to the path of movement of the movable member, the connecting means being arranged between the inspection device and the movable supporting means for at least one of the actuating members and serving to effect contact between an actuating member and the movable member for spreading apart the longitudinally-extending elements.

2. The machine as set forth in claim 1, wherein two of said actuating members are provided and have the form of camming ramps, one ramp being disposed in relation to the direction of movement of the cylindrical supports as to actuate the movable members of all supports as they travel relative to the track means and the other ramp being adapted for relative movement, the supports constituting a set of first electrodes, the inspection device including a second electrode and each first electrode and the second electrode being included in an electrical circuit also comprising a source of electrical energy, switch means and terminal means, the latter being operatively associated with the relatively movable ramp for moving such ramp in response to completion of such circuit.

3. The machine as set forth in claim 1, wherein bearing means are provided in relation to the track means, the supports are rotatably mounted in the bearing means in axially-immovable manner, rail means are provided in the frame along the path of movement and driving means are provided on the supports and are adapted to cooperate with the rail means to rotate the supports.

4. The machine as set forth in claim 1, wherein a first chute is provided adjacent the first ejection device, a second chute is provided adjacent the second ejection device, and a roof member projects over the path of movement of the supports for receiving hollow articles ejected by spreading apart of the longitudinally-extending elements and directing them to a chute.

5. The machine as set forth in claim 1, wherein two of said actuating members are provided and have the form of camming ramps, one ramp being disposed in relation to the direction of movement of the cylindrical supports as to actuate the movable members of all supports as they travel relative to the track means and the other ramp being adapted for relative movement, the supports constituting a set of first electrodes, the inspection device including a second electrode and each first electrode and the second electrode being included in an electrical circuit also comprising a source of electrical energy, switch means and terminal means, the latter being operatively associated with the relatively movable ramp for moving such ramp in response to completion of such circuit, and wherein setting means comprising magnets are provided for actuating the movable ramp, a stepping switch is provided for operating the magnets and is located in circuit with the electrodes and is adapted to open a control circuit on energisation of a magnet, cam means being located on the track means spaced from the supports and adapted to move with the supports, first and second contact switch means are provided in the frame adjacent the track means, the second contact switch means being in operative connection with the movable ramp and both contact switch means being connected in series in the circuit with a control relay, the second control switch means being adapted to remain closed while the movable ramp is located in its operative position and the first contact switch means being adapted to become closed on passage of a cam means in the path of movement on the track means.

6. The machine as set forth in claim 1, wherein bearing means are located on the track means, at least one support is rotatably mounted in the bearing means, an axially-movable sleeve is supported by the lower end of the support in non-rotatable relation thereto and is adapted for cooperation with actuating elements, spring means being provided between the support and the sleeve for downwardly urging such sleeve, contact of an actuating element moving upward the sleeve against the action of the spring means, and a connecting rod and lever system interconnecting the sleeve and the lower ends of the longitudinally-extending elements for effecting outward spreading thereof on upward movement of the sleeve.

7. The machine as set forth in claim 1, wherein bearing means are located on the track means, at least one support is rotatably mounted in the bearing means, an axially-movable sleeve is supported by the lower end of the support in non-rotatable relation thereto and is adapted for cooperation with actuating elements, spring means being provided between the support and the sleeve for downwardly urging such sleeve, contact of an actuating element moving upward the sleeve against the action of the spring means, and a connecting rod and lever system interconnecting the sleeve and the lower ends of the longitudinally-extending elements for effecting outward spreading thereof on upward movement of the sleeve, such longitudinally-extending elements comprising flexible material, arcuate guide rail means are disposed on the supports and carry guide members adapted for movement longitudinally of the rail means and connected with the lower ends of such elements for cooperating with the connecting rod and lever system.

8. The machine as set forth in claim 1, wherein bearing means are located on the track means, at least one support is rotatably mounted in the bearing means, an axially-movable sleeve is supported by the lower end of the support in non-rotatable relation thereto and is adapted for cooperation with actuating elements, spring means being provided between the support and the sleeve for downwardly urging such sleeve, contact of an actuating element moving upward the sleeve against the action of the spring means, and a connecting rod and lever system interconnecting the sleeve and the lower ends of the longitudinally-extending elements for effecting outward spreading thereof on upward movement of the sleeve, which is provided with a plate member under which ramp-like actuating elements are engageable.

9. The machine as set forth in claim 1, wherein bearing means are located on the track means, at least one support is rotatably mounted in the bearing means, an axially-movable sleeve is supported by the lower end of the support in non-rotatable relation thereto and is adapted for cooperation with actuating elements, spring means being provided between the support and the sleeve for downwardly urging such sleeve, contact of an actuating element moving upward the sleeve against the action of the spring means, and a connecting rod and lever system interconnecting the sleeve and the lower ends of the longitudinally-extending elements for effecting outward spreading thereof on upward movement of the sleeve, such longitudinally-extending elements comprising flexible material, arcuate guide rail means are disposed on the supports and carry guide members adapted for movement longitudinally of the rail means and connected with the lower ends of such elements for cooperating with the connecting rod and lever system, the guide rail means being adapted to impart tension to the longitudinally-extending elements.

10. The machine as set forth in claim 1, wherein the longitudinally-extending elements comprise strip means adapted for location within axial grooves formed in the limiting surfaces of the supports.

No references cited.

ROBERT B. REEVES, *Primary Examiner.*